(12) United States Patent
Altaheini (10) Patent No.: US 10,519,768 B2
(45) Date of Patent: Dec. 31, 2019

(54) SYSTEMS AND METHODS FOR OPERATING HYDROCARBON WELLS TO INHIBIT BREAKTHROUGH BASED ON RESERVOIR SATURATION

(71) Applicant: Saudi Arabian Oil Company, Dhahran (SA)

(72) Inventor: Suleiman Altaheini, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 176 days.

(21) Appl. No.: 15/901,356

(22) Filed: Feb. 21, 2018

(65) Prior Publication Data
US 2019/0257195 A1 Aug. 22, 2019

(51) Int. Cl.
*E21B 49/00* (2006.01)
*E21B 43/12* (2006.01)
(Continued)

(52) U.S. Cl.
CPC .............. *E21B 49/00* (2013.01); *E21B 34/06* (2013.01); *E21B 43/12* (2013.01); *E21B 47/06* (2013.01); *G01V 9/02* (2013.01)

(58) Field of Classification Search
CPC .......... E21B 49/00; E21B 43/12; E21B 47/09; E21B 47/06; E21B 34/06; E21B 34/02; G01V 9/02
See application file for complete search history.

(56) References Cited

U.S. PATENT DOCUMENTS

| 7,089,167 | B2 | 8/2006 | Poe |
| 7,172,020 | B2 | 2/2007 | Tseytlin |

(Continued)

FOREIGN PATENT DOCUMENTS

| GB | 2492466 A | 1/2013 |
| WO | 2006127151 A1 | 11/2006 |

(Continued)

OTHER PUBLICATIONS

Schlumberger "ECLIPSE Version 2014.1 reservoir simulation software Reference Manual" 2014; pp. 1-2831.
(Continued)

*Primary Examiner* — Michael R Wills, III
(74) *Attorney, Agent, or Firm* — Bracewell LLP; Constance G. Rhegergen; Christopher L. Drymalla (57) ABSTRACT

Provided are embodiments that include determining cellular volumes having a saturation value for a given time that is above a threshold saturation value and having a location within a threshold distance of a perforation location of a production well, determining a nearest cell distance defined by a minimum distance between the perforation location and locations of the determined cellular volumes, determining an operating bottom-hole pressure (BHP) and a surface well pressure (SWP) for the well for the given time, determining a minimum operating BHP for the well for the given time according to a specified relationship of the operating BHP, the SWP, the threshold saturation value, the threshold distance, and the nearest cell distance, and operating the well at a production rate to maintain a BHP of the well at or above the minimum operating BHP for a time period associated with the given time.

22 Claims, 4 Drawing Sheets

(51) Int. Cl.
      *E21B 34/06*       (2006.01)
      *G01V 9/02*       (2006.01)
      *E21B 47/06*       (2012.01)

(56) References Cited

U.S. PATENT DOCUMENTS

| | | | |
|---|---|---|---|
| 7,363,164 B2 * | 4/2008 | Little | G01V 11/00 |
| | | | 702/13 |
| 7,672,825 B2 | 3/2010 | Brouwer et al. | |
| RE42,245 E | 3/2011 | Thomas et al. | |
| 8,589,135 B2 | 11/2013 | Middya et al. | |
| 9,745,833 B2 | 8/2017 | Carvajal et al. | |
| 9,797,229 B2 | 10/2017 | Wingate | |
| 2005/0114029 A1 * | 5/2005 | Clavaud | G01V 1/50 |
| | | | 702/7 |
| 2008/0262737 A1 | 10/2008 | Thigpen et al. | |
| 2014/0039860 A1 | 2/2014 | Carvajal et al. | |

FOREIGN PATENT DOCUMENTS

| | | |
|---|---|---|
| WO | 2013119248 A2 | 8/2013 |
| WO | 2015153680 A1 | 10/2015 |
| WO | 2016118807 A1 | 7/2016 |

OTHER PUBLICATIONS

Stackel, Andrew W. et al.; "An Example Approach to Predictive Well Management in Reservoir Simulation" SPE-7698-PA, Journal of Petroleum Technology, Jun. 1981; pp. 1087-1094.
International Search Report and Written Opinion for International Application No. PCT/US2019/018857 report dated Jun. 11, 2019; pp. 1-12.

* cited by examiner

SYSTEMS AND METHODS FOR OPERATING HYDROCARBON WELLS TO INHIBIT BREAKTHROUGH BASED ON RESERVOIR SATURATION

FIELD

Embodiments relate generally to developing wells, and more particularly to operating hydrocarbons wells to inhibit the production of water at the wells.

BACKGROUND

A well generally includes a wellbore (or "borehole") that is drilled into the earth to provide access to a geographic formation below the earth's surface (or "subsurface formation"). The well may facilitate the extraction of natural resources, such as hydrocarbons and water from the subsurface formation, facilitate the injection of fluids into the subsurface formation, or facilitate the evaluation and monitoring of the subsurface formation. In the petroleum industry, hydrocarbon wells are often drilled to extract (or "produce") hydrocarbons, such as oil and gas, from subsurface formations. The term "oil well" is often used to refer to a well designed to produce oil. In the case of an oil well, some natural gas is typically produced along with oil. A well producing both oil and natural gas is sometimes referred to as an "oil and gas well" or "oil well."

Creating an oil well typically involves several stages, including a drilling stage, a completion stage and a production stage. The drilling stage normally involves drilling a wellbore into a subsurface formation that is expected to contain a concentration of hydrocarbons that can be produced. The portion of the subsurface formation expected to contain hydrocarbons is often referred to as a "hydrocarbon reservoir" or "reservoir." The drilling process is normally facilitated by a drilling rig that sits at the earth's surface. The drilling rig can provide for operating a drill bit to cut the wellbore, hoisting, lowering and turning drill pipe and tools, circulating drilling fluids in the wellbore, and generally controlling various operations in the wellbore (often referred to as "down-hole" operations). The completion stage involves making the well ready to produce hydrocarbons. In some instances, the completion stage includes installing casing pipe into the wellbore, cementing the casing in place, perforating the casing pipe and cement, installing production tubing, installing downhole valves for regulating production flow, and pumping fluids into the well to fracture, clean or otherwise prepare the reservoir and well to produce hydrocarbons. The production stage involves producing hydrocarbons from the reservoir by way of the well. During the production stage, the drilling rig is normally removed and replaced with a collection of valves at the surface (often referred to as "surface valves" or a "production tree"), and valves are installed into the wellbore (often referred to as "downhole valves"). These surface and downhole valves can be operated to regulate pressure in the wellbore, to control production flow from the wellbore and to provide access to the wellbore in the event further completion work is needed. A pump jack or other mechanism can provide lift that assists in extracting hydrocarbons from the reservoir, especially in instances where the pressure in the well is so low that the hydrocarbons do not flow freely to the surface. Flow from an outlet valve of the production tree is normally connected to a distribution network of midstream facilities, such as tanks, pipelines and transport vehicles, which transport the production to downstream facilities, such as refineries and export terminals.

Although it is generally desirable to produce only hydrocarbons, such as oil, the production fluids often include other substances, such as water or gas. For example, if a reservoir contains pockets of water, the water may migrate to the wellbore, resulting in unwanted water production. The encroachment of a substance, such as water or gas, into a wellbore is often referred to as "breakthrough" of the substance (e.g., "water breakthrough" or "gas breakthrough"). The amount of water comingled with production may be characterized by a "water-cut" of the production. Oil production having a relatively large amount of water comingled therein will have a relatively high water-cut value, whereas oil production having a relatively small amount of water comingled therein will have a relatively low water-cut value. The amount of gas comingled with oil production may be characterized by a "gas-oil ratio" (or "GOR") of the production. Oil production having a relatively large amount of gas comingled therein will have a relatively high gas-oil ratio, whereas oil production having a relatively small amount of gas comingled therein will have a relatively low gas-oil ratio.

SUMMARY

Applicants have recognized that optimizing production of a hydrocarbon well, such as an oil well, can be difficult, especially in instances in which a reservoir contains water that can encroach on the well. For example, if a production hydrocarbon well has a wellbore extending into a reservoir, near a highly saturated region of the reservoir, a well operator may need to operate the well, as well as other wells in the field, in a manner to inhibit the migration of the water from the highly saturated region into the wellbore. This can include, for example, operating the production well at certain production rates and pressures, operating surrounding production wells at certain production rates and pressures, or operating surrounding injection wells at certain production rates and pressures, to inhibit the migration of the water from the highly saturated region into the wellbore. Such coordinated efforts in operating a production well and surrounding wells, can help to eliminate or reduce water breakthrough at the production well. Unfortunately, existing techniques for operating production wells do not provide a robust, analytical solution that can provide a well operator with a focused set of operations to maximize hydrocarbon production and prevent (or at least minimize or delay) water breakthrough at a well.

Recognizing these and other shortcomings of existing techniques for optimizing production of a hydrocarbon production well, Applicants have developed novel systems and methods for operating a hydrocarbon production well to prevent (or at least minimize or delay) water breakthrough at the hydrocarbon production well. Such techniques may, in turn, help to maximize hydrocarbon production from the well. The described embodiments can provide a focused set of operating parameters that can be employed by a well operator to prevent (or at least minimize or delay) water breakthrough at the well and, in turn, reduce the time and costs associated with assessing the well, and maximize hydrocarbon production from the well. For example, embodiments may provide a minimum BHP operating parameter for a hydrocarbon production well that can be adhered to, to inhibit water breakthrough at the well.

In some embodiments, water saturation in an area around a hydrocarbon production well is assessed (e.g., by way of well simulation) to identify a closest of any areas of relatively high water saturation, a minimum operating bottom-hole pressure (BHP) for the well is determined based on a distance to the closest area of relatively high water saturation and other operational parameters, and the well is operated at a production rate corresponding to the minimum operating BHP to inhibit water breakthrough at the well. Such operations can be conducted iteratively, for a span of time to provide for dynamic adjustment of operational parameters of the well, as the well develops, to inhibit water breakthrough at the well over time.

In some embodiments, monitoring the water saturation in the area around the hydrocarbon production well includes the following: (1) determining water saturation values for cellular regions (or "cells") in the formation, surrounding the wellbore of the well; and (2) identifying any of the cells that (a) are within a threshold distance (or "search distance") ($D_T$) of perforations of the wellbore, and (b) have a water saturation value (Sw) above a water saturation threshold value ($Sw_T$). These cells may be referred to as "nearby saturated cells". The monitoring may further include, in response to identifying any nearby saturated cells, (3) determining a distance ($D_{NC}$) between the perforations in the wellbore and a cell of the nearby saturated cells that is closest to the perforations. This cell may be referred to as a "nearest saturated cell", and the distance may be referred to as a "nearest saturated cell distance" or "nearest cell distance". In some embodiments, the minimum operating BHP for the well is determined based on the nearest saturated cell distance ($D_{NC}$), the threshold distance ($D_T$), the threshold water saturation value ($Sw_T$), and current operating conditions for the well, including a current operating BHP and a current static well pressure (SWP) for the well.

Provided in some embodiments is a method that includes determining whether any cellular volumes of a plurality of cellular volumes surrounding a wellbore of a hydrocarbon production well has a saturation value for a given time that is above a threshold saturation value and has a location that is within a threshold distance of a perforation location. The perforation location defined by a location of perforations in the wellbore of the hydrocarbon production well. The method also including, in response to determining that at least one of the cellular volumes of the plurality of cellular volumes has a saturation value for the given time that is above the threshold saturation value and has a location that is within the threshold distance of the perforation location: determining a nearest cell distance defined by a minimum distance between the perforation location and locations of the at least one of the cellular volumes having a saturation value that is above the threshold saturation value and having a location that is within the threshold distance of the perforation location; determining operating conditions for the production well for the given time, including an operating bottom-hole pressure (BHP) for the production well for the given time and a surface well pressure (SWP) for the production well for the given time; determining a minimum operating BHP ($BHP_{min}^{n+1}$) for the given time according to the following relationship:

$$BHP_{min}^{n+1} = BHP^n + (SWP^n - BHP^n) * S_T * \left(1 - \frac{D_{NC}}{D_T}\right),$$

where $BHP^n$ is the operating BHP for the production well for the given time, $SWP^n$ is the SWP for the production well for the given time, $S_T$ is the threshold saturation value, $D_T$ is the threshold distance, and $D_{NC}$ is the nearest cell distance; and operating the hydrocarbon production well at a production rate to maintain a BHP of the production well at or above the minimum operating BHP for a time period associated with the given time.

In some embodiments, the perforations include perforations in a casing of the wellbore, and the perforation location includes a location of the perforations in the casing of the wellbore. In certain embodiments, the method further includes: determining, using a well model for the production well, a saturation value for each cellular volume of the plurality of cellular volumes for the given time; determining, using the well model for the production well, the operating BHP for the production well for the given time; and determining, using the well model for the production well, the SWP for the production well for the given time. In some embodiments, the saturation value is a water saturation value, and the threshold saturation value is a threshold water saturation value. In certain embodiments, determining a nearest cell distance includes, for each cellular volume of the at least one of the cellular volumes having a saturation value that is above the threshold saturation value and having a location that is within the threshold distance of the perforation location: determining a cell location; and determining a cell distance defined by a distance between the cell location and the perforation location, with the nearest cell distance being the minimum of the cell distances determined for the at least one of the cellular volumes having a saturation value for the given time that is above the threshold saturation value and having a location that is within the threshold distance of the perforation location. In some embodiments, the cell location for each cellular volume includes a location at a center of the cellular volume. In certain embodiments, operating the hydrocarbon production well at a production rate to maintain the BHP of the production well at or above the minimum operating BHP includes adjusting a flow control valve to achieve the production rate to maintain the BHP of the production well at or above the minimum operating BHP. In some embodiments, the method further includes: determining whether any of the cellular volumes of the plurality of cellular volumes has a second saturation value for a second time that is above the threshold saturation value and has a location that is within the threshold distance of the perforation location; and, in response to determining that none of the cellular volumes of the plurality of cellular volumes has a second saturation value for the second time that is above the threshold saturation value and has a location that is within the threshold distance of the perforation location: determining a second minimum operating BHP for the second time defined by an absolute minimum operating BHP for the hydrocarbon production well; and operating the hydrocarbon production well to maintain the BHP of the production well at or above the second minimum operating BHP for a second time period associated with the second time. In certain embodiments, the absolute minimum operating BHP for the hydrocarbon production well is above a dew point pressure or a bubble point pressure for the hydrocarbon production well. In some embodiments, the method further includes generating a production schedule defining, for each of a plurality of different time periods, a minimum operating BHP, where the production schedule defines the minimum operating BHP for the time period associated with the given time, and where the hydrocarbon production well is operated in accordance with the production schedule to, for each individual time period of the plurality of different time periods, maintain the BHP of the production well at or above the minimum operating BHP defined by the production schedule for the individual time period.

Provided in some embodiments is a hydrocarbon production well system that includes a well production system adapted to regulate a production rate of a hydrocarbon production well and a well control system. The well control system adapted to perform the following operations: determine whether any cellular volumes of a plurality of cellular volumes surrounding a wellbore of the hydrocarbon production well has a saturation value for a given time that is above a threshold saturation value and has a location that is within a threshold distance of a perforation location defined by a location of perforations in the wellbore of the hydrocarbon production well; and, in response to determining that at least one of the cellular volumes of the plurality of cellular volumes has a saturation value for the given time that is above the threshold saturation value and has a location that is within the threshold distance of the perforation location: determine a nearest cell distance defined by a minimum distance between the perforation location and locations of the at least one of the cellular volumes having a saturation value that is above the threshold saturation value and having a location that is within the threshold distance of the perforation location; determine operating conditions for the production well for the given time, including an operating bottom-hole pressure (BHP) for the production well for the given time, and a surface well pressure (SWP) for the production well for the given time; determine a minimum operating BHP ($BHP_{min}^{n+1}$) for the given time according to the following relationship:

$$BHP_{min}^{n+1} = BHP^n + (SWP^n - BHP^n) * S_T * \left(1 - \frac{D_{NC}}{D_T}\right),$$

where $BHP^n$ is the operating BHP for the production well for the given time, $SWP^n$ is the SWP for the production well for the given time, $S_T$ is the threshold saturation value, $D_T$ is the threshold distance, and $D_{NC}$ is the nearest cell distance; and control operation of the well production system to operate the hydrocarbon production well at a production rate to maintain a BHP of the production well at or above the minimum operating BHP for a time period associated with the given time.

In some embodiments, the perforations include perforations in a casing of the wellbore, and the perforation location includes a location of the perforations in the casing of the wellbore. In certain embodiments, the well control system is further adapted to perform the following operations: determine, using a well model for the production well, a saturation value for each cellular volume of the plurality of cellular volumes for the given time; determine, using the well model for the production well, the operating BHP for the production well for the given time; and determine, using the well model for the production well, the SWP for the production well for the given time. In some embodiments, the saturation value is a water saturation value, and the threshold saturation value is a threshold water saturation value. In certain embodiments, determining a nearest cell distance includes, for each cellular volume of the at least one of the cellular volumes having a saturation value that is above the threshold saturation value and having a location that is within the threshold distance of the perforation location: determining a cell location; and determining a cell distance defined by a distance between the cell location and the perforation location, where the nearest cell distance is the minimum of the cell distances determined for the at least one of the cellular volumes having a saturation value for the given time that is above the threshold saturation value and having a location that is within a threshold distance of the perforation location. In some embodiments, the cell location for each cellular volume includes a location at a center of the cellular volume. In certain embodiments, controlling operation of the well production system to operate the hydrocarbon production well at a production rate to maintain the BHP of the production well at or above the minimum operating BHP includes adjusting a flow control valve of the well production system to achieve the production rate to maintain the BHP of the production well at or above the minimum operating BHP. In some embodiments, the well control system is further adapted to perform the following operations: in response to determining that none of the cellular volumes of the plurality of cellular volumes has a saturation value for the given time that is above the threshold saturation value and has a location that is within the threshold distance of the perforation location: determine a minimum operating BHP for the given time defined by an absolute minimum operating BHP for the hydrocarbon production well; and control operation of the well production system to operate the hydrocarbon production well at a production rate to maintain the BHP of the production well at or above the minimum operating BHP for a time period associated with the given time. In certain embodiments, the absolute minimum operating BHP for the hydrocarbon production well is above a dew point pressure or a bubble point pressure for the hydrocarbon production well. In some embodiments, the well control system is further adapted to perform the following operations: generate a production schedule defining, for each of a plurality of different time periods, a minimum operating BHP, where the production schedule defines the minimum operating BHP for the time period associated with the given time, and where the hydrocarbon production well is operated in accordance with the production schedule to, for each individual time period of the plurality of different time periods, maintain the BHP of the production well at or above the minimum operating BHP defined by the production schedule for the individual time period.

Provided in some embodiments is a non-transitory computer readable storage medium having program instructions stored thereon that are executable by a processor to perform operations including determining whether any cellular volumes of a plurality of cellular volumes surrounding a wellbore of a hydrocarbon production well has a saturation value for a given time that is above a threshold saturation value and has a location that is within a threshold distance of a perforation location. The perforation location defined by a location of perforations in the wellbore of the hydrocarbon production well. The operations also including, in response to determining that at least one of the cellular volumes of the plurality of cellular volumes has a saturation value for the given time that is above the threshold saturation value and has a location that is within the threshold distance of the perforation location: determining a nearest cell distance defined by a minimum distance between the perforation location and locations of the at least one of the cellular volumes having a saturation value that is above the threshold saturation value and having a location that is within the threshold distance of the perforation location; determining operating conditions for the production well for the given time, including an operating bottom-hole pressure (BHP) for the production well for the given time and a surface well pressure (SWP) for the production well for the given time; determining a minimum operating BHP ($BHP_{min}^{n+1}$) for the given time according to the following relationship:

$$BHP_{min}^{n+1} = BHP^n + (SWP^n - BHP^n) * S_T * \left(1 - \frac{D_{NC}}{D_T}\right),$$

where $BHP^n$ is the operating BHP for the production well for the given time, $SWP^n$ is the SWP for the production well for the given time, $S_T$ is the threshold saturation value, $D_T$ is the threshold distance, and $D_{NC}$ is the nearest cell distance; and operating the hydrocarbon production well at a production rate to maintain a BHP of the production well at or above the minimum operating BHP for a time period associated with the given time.

In some embodiments, the operations further include, in response to determining that none of the cellular volumes of the plurality of cellular volumes has a saturation value for the given time that is above the threshold saturation value and has a location that is within the threshold distance of the perforation location: determining a minimum operating BHP for the given time defined by an absolute minimum operating BHP for the hydrocarbon production well; and operating the hydrocarbon production well at a production rate to maintain the BHP of the production well at or above the minimum operating BHP for a time period associated with the given time.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for operating a hydrocarbon production well to prevent (or at least minimize or delay) water breakthrough at the hydrocarbon production well. Such techniques may, in turn, help to maximize hydrocarbon production from the well. The described embodiments can provide a focused set of operating parameters that can be employed by a well operator to prevent (or at least minimize or delay) water breakthrough at the well and, in turn, reduce the time and costs associated with assessing the well, and maximize hydrocarbon production from the well. For example, embodiments may provide a minimum BHP operating parameter for a hydrocarbon production well that can be adhered to, to inhibit water breakthrough at the well.

In some embodiments, water saturation in an area around a hydrocarbon production well is assessed (e.g., by way of well simulation) to identify a closest of any areas of relatively high water saturation, a minimum operating bottom-hole pressure (BHP) for the well is determined based on a distance to the closest area of relatively high water saturation and other operational parameters, and the well is operated at a production rate corresponding to the minimum operating BHP to inhibit water breakthrough at the well. Such operations can be conducted iteratively, for a span of time to provide for dynamic adjustment of operational parameters of the well, as the well develops, to inhibit water breakthrough at the well over time.

In some embodiments, monitoring the water saturation in the area around the hydrocarbon production well includes the following: (1) determining water saturation values for cellular regions (or "cells") in the formation, surrounding the wellbore of the well; and (2) identifying any of the cells that (a) are within a threshold distance (or "search distance") ($D_T$) of perforations of the wellbore, and (b) have a water saturation value (Sw) above a water saturation threshold value ($Sw_T$). These cells may be referred to as "nearby saturated cells". The monitoring may further include, in response to identifying any nearby saturated cells, (3) determining a distance ($D_{NC}$) between the perforations in the wellbore and a cell of the nearby saturated cells that is closest to the perforations. This cell may be referred to as a "nearest saturated cell", and the distance may be referred to as a "nearest saturated cell distance" or "nearest cell distance". In some embodiments, the minimum operating BHP for the well is determined based on the nearest saturated cell distance ($D_{NC}$), the threshold distance ($D_T$), the threshold water saturation value ($Sw_T$), and current operating conditions for the well, including a current operating BHP and a current operating static well pressure (SWP) for the well.

Although certain embodiments are described in the context of inhibiting water breakthrough, the techniques described may be applied in other context, such as for inhibiting gas breakthrough based on gas saturations, as opposed to water saturations, in an area around a hydrocarbon production well. For example, gas saturations for cells and a gas saturation threshold may be used in place of the water saturation values for cells and a water saturation threshold value, respectively.

Figure 1:
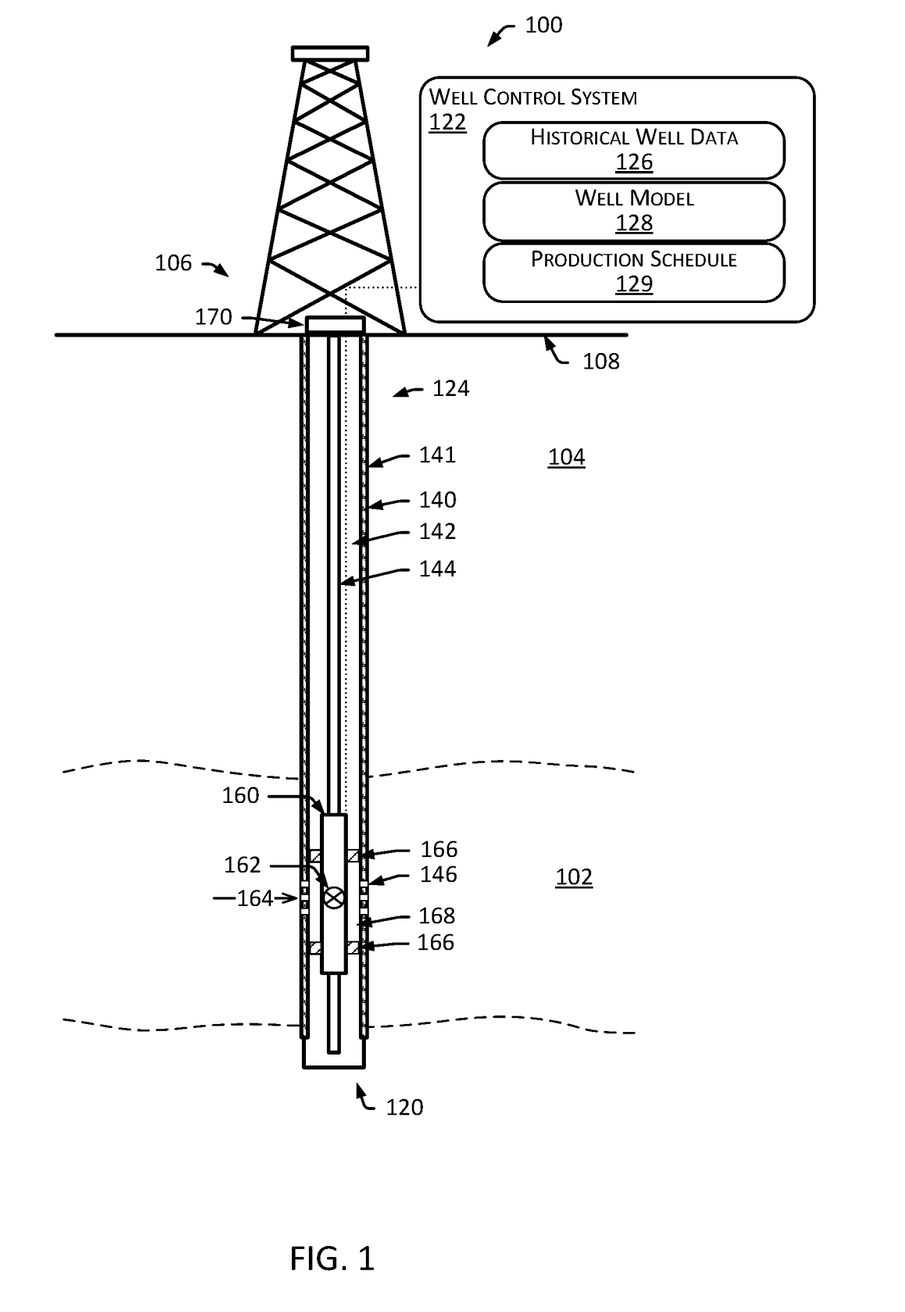
FIG. 1 is diagram that illustrates a well environment in accordance with one or more embodiments.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104 and a well system ("well") 106.

The formation 104 may include a porous or fractured rock formation that resides underground, beneath the earth's surface ("surface") 108. In the case of the well 106 being a hydrocarbon well, the reservoir 102 may include a portion of the formation 104 that contains (or that is at least determined to or expected to contain) a subsurface pool of hydrocarbons, such as oil and gas. The formation 104 and the reservoir 102 may each include different layers of rock having varying characteristics, such as varying degrees of permeability, porosity, and fluid saturations. In the case of the well 106 being operated as a production well, the well 106 may facilitate the extraction of hydrocarbons (or "production") from the reservoir 102.

The well 106 may include a wellbore 120, a well control system ("control system") 122 and a well production system 124. The control system 122 may control various operations of the well 106, such as well drilling operations, well completion operations, well production operations, and well and formation monitoring operations. In some embodiments, the control system 122 includes a computer system that is the same as or similar to that of computer system 1000 described with regard to at least FIG. 4.

In some embodiments, the control system 122 stores, or otherwise has access to, historical well data 126. The historical well data 126 may include historical data that is indicative conditions of the well 106 over a past time span. The time span may be, for example, from Jan. 1, 1970 (e.g., the date when the well 106 was drilled and a first set of measurements are recorded for the well 106) to Dec. 31, 2017 (e.g., the date when a last set of measurements was recorded for the well 106). For example, the historical well data 126 may include well logs (e.g., resistivity logs for the well 106 or other wells in the same field as the well 106) or operational data (e.g., measures of observed production rates and BHP) acquired over the past time span. The historical well data 126 may, for example, be used to estimate (or otherwise be indicative of) water saturations in an area surrounding the well 106, over the time span. For example, the resistivity logs for the well 106 over a time span may be used to initialize a well model used to model water saturations in the area surrounding the well 106, over the time span.

A resistivity log may include, for example, a log of resistivity of the formation 104 versus depth in the wellbore 120. A resistivity log may be acquired, for example, by way of resistivity logging operation, including logging the wellbore 120 using a resistivity logging tool run along a length of the wellbore 120. The measures of observed BHPs for the well 106 may be determined based on pressure values measured by a pressure sensor, such as bottom-hole pressure sensor ("BHPS") located in the wellbore 120 or a surface pressure sensor ("SPS") located at surface 108. For example, a BHP at a depth of perforations in the wellbore 120 may be determined using a pressure measured by a BHPS disposed in the wellbore 120 at the depth of the perforations. As a further example, a BHP at a depth of perforations in the wellbore 120 may be determined using a pressure measured by a SPS disposed at an up-hole end of the wellbore 120 (e.g., at a wellhead of the well 106), and knowledge of the characteristics of the wellbore 120 and substances contained in the wellbore 120 can be applied to estimate the pressure in the wellbore 120 at the depth of the perforations.

In some embodiments, the historical well data 126 is used to generate a model of the well 106. For example, a model ("well model") 128 of the well 106 may be generated by way of history matching the historical well data 126. In some embodiments, the model 128 of the well 106 can be used to simulate (or "predict") characteristics of the well 106. Continuing with the above example, the model 128 may be used, for example, to simulate characteristics of the well 106 for points in time after Dec. 31, 2017. In some embodiments, the simulated conditions include water saturation values for the area surrounding the well 106, an operating production rate of the well 106, an operating BHP for the well 106, or a SWP for the well 106. For example, the model 128 may be used to simulate migration of water and corresponding changes in water saturation in areas around the well 106, as well as changes in an operating production rate of the well 106, an operating BHP for the well 106, and a SWP for the well 106, at different points in time after Dec. 31, 2017.

In some embodiments, the water saturation values for the area surrounding the well 106 include water saturation values for cellular regions (or "cells") in the formation 104, surrounding the wellbore 120 of the well 106. In some embodiments, the BHP for the well 106 is defined by a pressure in the wellbore 120 of the well 106, at or near perforations in the wellbore 120 (e.g., a pressure in the wellbore 120 at the depth of the perforations in the wellbore 120). In some embodiments, the SWP for the well 106 is defined by a pressure associated with one or more cells that contain the perforations in the wellbore 120. For example, where the perforations of the well 106 are contained in a given cell, the SWP for the well 106 can be a SWP determined for given cell, or a combination of SWPs determined for the given cell and one or more other cubic cells surrounding the given cell (e.g., an average of the SWP determined for the given cell and SWPs determined for the cells sharing a vertex with the given cell).

In some embodiments, characteristics of the well 106 are determined by way of a numerical simulation modeling of the well 106, using the model 128. For example, the water saturation value for each of the cells, the BHP for the well 106 and the SWP for the well 106 may be determined by way of a numerical simulation modeling of the well 106, using the model 128 of the well 106. The numerical modeling may simulate the water saturation value for each of the cells, the BHP for the well 106 and the SWP for the well 106 at different points in time. For example, where the modeling is employed for a one month interval, the numerical modeling may generate a first simulated (or "predicted") water saturation value for each of the cells surrounding the well 106, a first BHP for the well 106 and a first SWP for the well 106 at a first time ($T_1$) of Jan. 31, 2018, generate a second simulated water saturation value for each of the cells surrounding the well 106, a second BHP for the well 106 and a second SWP for the well 106 at a second time ($T_2$) of Feb. 31, 2018, and so forth. The modeling may be employed on any suitable interval, such as a day, a week, a month, six months, one year, two years, five years, ten years, or the like.

The wellbore 120 may include a bored hole that extends from the surface 108 into a target zone of the formation 104, such as the reservoir 102. An upper end of the wellbore 120, at or near the surface 108, may be referred to as the "up-hole" end of the wellbore 102, and a lower end of the wellbore 120, terminating in the formation 104, may be referred to as the "down-hole" end of the wellbore 120. The wellbore 120 may be created, for example, by a drill bit boring through the formation 104 and the reservoir 102. The wellbore 120 may provide for the circulation of drilling fluids during drilling operations, the flow of hydrocarbons (e.g., oil and gas) from the reservoir 102 to the surface 108 during production operations, the injection of substances (e.g., water) into the formation 104 or the reservoir 102 during injection operations, or the communication of monitoring devices (e.g., logging tools) into one or both of the formation 104 and the reservoir 102 during monitoring operations (e.g., during in situ logging operations). In some embodiments, the wellbore 120 includes cased or uncased (or "open-hole") portions. A cased portion may include a portion of the wellbore 120 (e.g., the up-hole end of the wellbore 120) having casing 140 (e.g., casing pipe and/or casing cement) installed. An uncased portion may include a portion of the wellbore 120 (e.g., the down-hole end of the wellbore 120) not having the casing 140 installed.

In some embodiments, the casing 140 includes an annular casing that lines a wall 141 of the wellbore 120 to define a central passage 142 that provides a conduit for the transport of tools and substances through the wellbore 120. For example, the central passage 142 may provide a conduit for lowering logging tools into the wellbore 120, a conduit for the flow of production fluids, such as oil and gas, from the reservoir 102 to the surface 108, or a conduit for the flow of injection substances, such as water, from the surface 108 into the formation 104. In some embodiments, production tubing 144 is installed to provide an additional conduit for the transport of tools and substances through the wellbore 120. The production tubing 144 may, for example, be disposed inside the casing 140 and the open-hole portions of the wellbore 120. In such an embodiment, the production tubing 144 may provide a conduit for passage of production fluid through the wellbore 120 and the casing 140.

In some embodiments, the casing 140 includes perforations 146. The perforations 146 may include openings that extend between an exterior of the casing 140 and the central passage 142 of the casing 140, to facilitate the flow of production fluids, such as oil and gas, from the formation 104 into the central passage 142, or to facilitate the flow of injection substances, such as water, from the central passage 142 into the formation 104. Perforations 146 can take various forms, such as one or more elongated holes in the casing 140, or a mesh structure defined by a plurality of relatively small holes that enable the flow of substances across the holes, while also filtering out larger debris from the flowing substances.

In some embodiments, a completion unit 160 is disposed in the wellbore 120. The completion unit 160 may include a down-hole valve 162. The down-hole valve 162 may include one or more flow control valves that can regulate the flow of substances in the wellbore 120. The down-hole valve 162 may regulate the flow of substances, such as oil, gas and water, between the formation 104 and a production conduit, such as the central passage 142 of the casing 140 or the production tubing 144. The down-hole valve 162 may be provided in a fully opened position to enable full flow of production fluid 164 from the reservoir 102 into the central passage 142 or the production tubing 144. The down-hole valve 162 may be provided in a partially opened position to enable restricted (or "choked") flow of production fluid 164 from the reservoir 102 into the central passage 142 of the casing 140 or the production tubing 144. The down-hole valve 162 may be provided in a fully closed position to block (or "choke") the flow of production fluid 164 from the reservoir 102, to prevent the production fluid 164 from entering into the central passage 142 or the production tubing 144.

In some embodiments, the down-hole valve 162 is positioned to regulate the flow of production fluid 164 from a particular region of the formation 104 and wellbore 120. When installed inside casing 140, for example, the completion unit 160 may include completion packers 166 that expanded against the casing 140 to isolate (or "seal-off") portions of an annular region 168 located between the exterior of the production tubing 144 and the interior wall of the casing 140, to regulate the flow of production fluid 164 from a particular region of the formation 104. Thus, the down-hole valve 162 may regulate the flow of production fluid 164 into the production tubing 144 by way of the perforations 146 and the annular region 168. The down-hole valve 162 may be fully opened to enable full flow of production fluid 164 from the corresponding portion of the reservoir 102 into the production tubing 144, may be partially opened to enable partial (or "choked") flow of production fluid 164 from the corresponding portion of the reservoir 102 into the production tubing 144, or may be fully closed to block (or "choke") the flow of production fluid 164 from the corresponding portion of the reservoir 102 into the central passage 142 or the production tubing 144. Although the completion unit 160 has been described with regard to a cased portion of the wellbore 120, the completion unit 160 may be provided in an open-holed portion of the wellbore 120. In such an embodiment, the completion packers 166 may seal directly against the wall 141 of the wellbore 120, as opposed to the interior of the casing 140.

The down-hole valve 162 may include an inflow control valve (ICV) or an inflow control device (ICD). An ICD may include, for example, a flow control valve that is set into a given configuration (e.g., open, closed or partially opened) prior to being installed down-hole, in the wellbore 120. An ICD may need to be removed from the wellbore 120 to be set to a different configuration. An ICV may include, for example, a flow control valve that can be adjusted while located down-hole, in the wellbore 120. Such an ICV may be set into a configuration (e.g., open, closed or partially opened) prior to being installed down-hole in the wellbore 120, and may be subsequently controlled (e.g., by well control system 122) to different flow configurations while located down-hole, in the wellbore 120.

In some embodiments, the well 106 includes a surface valve (or "surface choke") 170. The surface valve 170 may include one or more flow control valves disposed at the up-hole end of the wellbore 120 to regulate the flow of substances from the wellbore 120. For example, the surface valve 170 may include one or more flow control valves installed a wellhead or production tree, located at an up-hole end of the wellbore 120 of the well 106. The surface valve 170 may, for example, regulate the flow of production fluid from production tubing disposed in the wellbore 120. The surface valve 170 may be provided in a fully opened position to enable full flow of production fluid 164 from the wellbore 120. The surface valve 170 may be provided in a partially opened position to enable restricted (or "choked") flow of production fluid 164 from the wellbore 120. The surface valve 170 may be provided in a fully closed position to block (or "choke") the flow of production fluid 164 from the wellbore 120. In some embodiments, the down-hole valve 162 and the surface valve 170 can be operated in coordination to achieve a desired production rate or bottom-hole pressure.

In some embodiments, the well 106 is operated as a hydrocarbon production well, and water saturation in an area around the well 106 is monitored to identify a closest of any areas of relatively high water saturation, a minimum operating BHP for the well 106 is determined based on a distance to the closest area of relatively high water saturation, and the well 106 is operated in accordance with operating parameters, such as a production rate, corresponding to the minimum operating BHP to inhibit water breakthrough at the wellbore 120 of the well 106. In some embodiments, these operations are conducted on a regular basis to dynamically adjust operational parameters as the well develops, to inhibit water breakthrough at the wellbore 120 of the well 106 over time.

In some embodiments, monitoring the water saturation in the area around the well 106 includes the following: (1) determining water saturation values for cells in the formation 104, surrounding the wellbore 120 of the well 106; and (2) identifying any of the cells that (a) are within a threshold distance ($D_T$) of the perforations 146 of the wellbore 120, and (b) have a water saturation value (Sw) above a water saturation threshold value ($Sw_T$). These cells may be referred to as "nearby saturated cells". The water saturation threshold value ($Sw_T$) may be, for example, 35%. The threshold distance ($D_T$) may be, for example, 100 m. In some embodiments, the threshold distance ($D_T$) is defined as a number of cells. For example, the threshold distance ($D_T$) may be defined as 5 cells, and where the cells 202 have a width of 20 m, the effective threshold distance ($D_T$) may be 100 m.

The monitoring may further include, in response to identifying any nearby saturated cells, (3) determining a distance ($D_{NC}$) between the perforations 146 of the wellbore 120 and a cell of the nearby saturated cells that is closest to the perforations 146. This cell may be referred to as a "nearest saturated cell", and the distance may be referred to as a "nearest saturated cell distance" or "nearest cell distance".

Figure 2A:
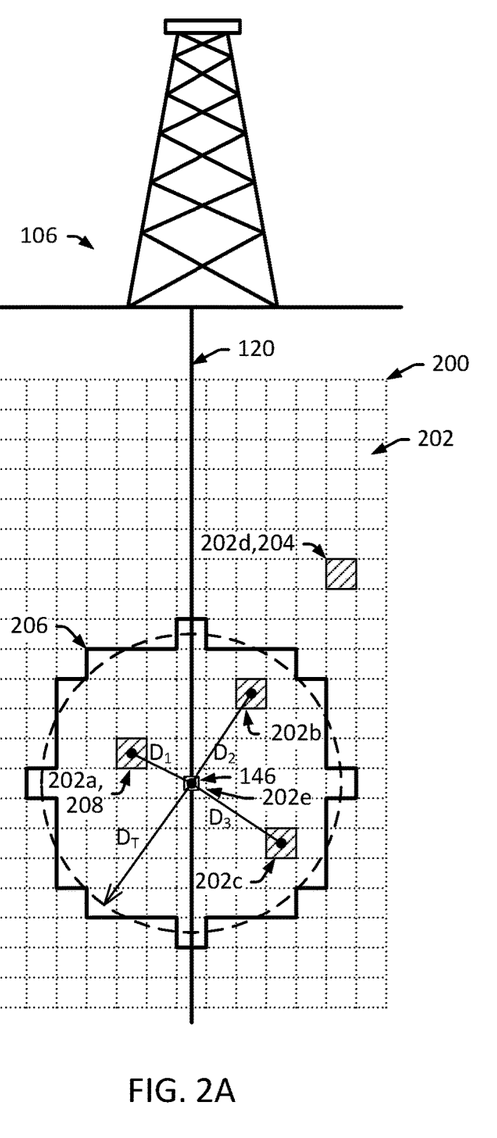
FIGS. 2A and 2B are diagrams that illustrate example cellular regions surrounding a well in accordance with one or more embodiments.
Figure 2B:
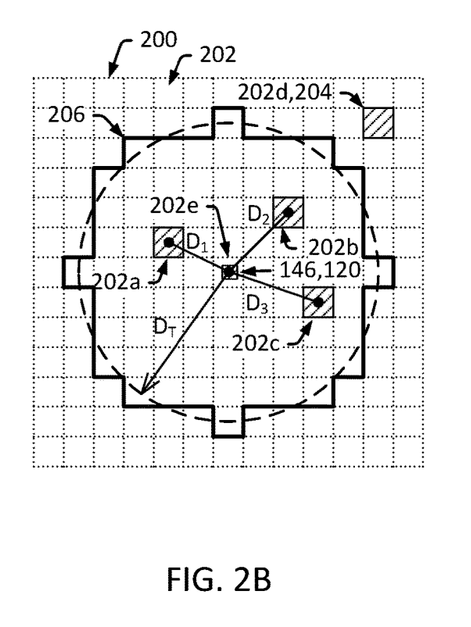

FIGS. 2A and 2B are diagrams that illustrates side and top views, respectively, of example cells surrounding the well 106 in accordance with one or more embodiments. The illustrated embodiment includes a rectangular region 200 defined by a width of thirteen cells 202, a length of thirteen cells 202, and depth of twenty-one cells 202. Each of the cells 202 may be cubic in shape, or of any suitable shape for mapping of the associated region. Each of the cells 202 may have an associated water saturation value (Sw). The water saturation value (Sw) for a given cell 202 may be determined by way of numerical simulation modeling of the well 106, using the model 128. For example, a respective water saturation value (Sw) for each of the cells 202 at a first time ($T_1$) of Jan. 31, 2018, at second time ($T_2$) of Feb. 28, 2018, at a third time ($T_3$) of Mar. 31, 2018, and so forth, may be determined by way of numerical simulation modeling of the well 106, using the model 128. Cells 202 determined to have a water saturation value (Sw) above a water saturation threshold value ($Sw_T$) may be referred to as "saturated cells". Referring to FIGS. 2A and 2B, the region 200 includes a set of saturated cells 204, defined by four saturated cells 202 (e.g., cells 202a, 202b, 202c and 202d), each having a water saturation value (Sw) above a water saturation threshold value ($Sw_T$)).

In some embodiments, a cell location for a cell 202 is defined as a center of a volume of the cell 202. For example, if a cell 202 is a cube, the center of the cell 202 may be located at a point that is an equal distance from each of the vertices of the cube. In some embodiments, a cell distance for a cell 202 is defined by a distance between the cell location for the cell 202 and the location of the perforations 146. For example, if a cell 202 is a cube, the cell distance for the cell 202 may be defined as the distance between the center of the cube and the location of the perforations 146. In some embodiments, a cell 202 is determined to be within a threshold distance ($D_T$) of the perforations 146 of the wellbore 120 if its cell distance (D) is less than or equal to the threshold distance ($D_T$). For example, if the threshold distance ($D_T$) is 100 m, the cells 202 having a cell distance (D) that is less than or equal to 100 m, may be considered to be within the threshold distance ($D_T$) of the perforations 146 of the wellbore 120. Cells 202 determined to be within a threshold distance ($D_T$) of the perforations 146 of the wellbore 120 may be referred to as "nearby cells". Referring to FIGS. 2A and 2B, the region 200 includes a set of nearby cells 206, defined by the cells 202 located within the bold outline (e.g., each having a cell distance (D) that is less than or equal to the threshold distance ($D_T$)). In some embodiments, only cells 202 determined to be within the threshold distance ($D_T$) of the perforations 146 of the wellbore 120 (e.g., only the set of nearby cells 206) are searched for saturated cells. Such a preliminary filtering of cells 202 to be searched may increase processing efficiency by eliminating computational overhead that may otherwise be required to assess water saturation values (Sw) for cells 202 that are outside of the threshold distance ($D_T$) of the perforations 146 (e.g., the saturated cell 202d) and, thus, would not satisfy the requirement of a nearby saturated cell, regardless of whether the cells 202 have a water saturation value (Sw) above the water saturation threshold value ($Sw_T$).

Individual cells 202 determined to be both saturated cells and nearby cells, may be referred to as "nearby saturated cells". Referring to FIGS. 2A and 2B, the region 200 includes a set of nearby saturated cells 208, defined by three cells 202 (e.g., cells 202a, 202b and 202c), each having a water saturation value (Sw) above the water saturation threshold value ($Sw_T$) and having a location within the threshold distance ($D_T$) of the perforations 146 of the wellbore 120. The fourth saturated cell 202d is excluded from the set of nearby saturated cells 208, based on it having a cell distance (D) that is greater than the threshold distance ($D_T$). In some embodiments, cells 202 that are determined to not contribute to the flow of water within the formation 104 (e.g., saturated cells 202 including preexisting or inactive pockets of water) are excluded from the set of cell 202, and, thus, are excluded from the set of nearby saturated cells. For example, if the cell 202c is determined to be a natural pocket of water that was present before the well 106 was drilled and injection operations commenced, or is otherwise determined unlikely to migrate from its location, the cell 202c may be excluded from the set of nearby saturated cells 208, such that the set of nearby saturated cells 208 is defined by the other two nearby saturated cells 202 (e.g., cells 202a and 202b). A nearest saturated cell distance ($D_{NC}$) may be determined as the smallest cell distance of the cell distances for the nearby saturated cells. For example, referring to FIGS. 2A and 2B, if the cell 202a has a cell distance ($D_1$) of 30 m, the cell 202b has a cell distance ($D_2$) of 80 m, and the cell 202c has a cell distance ($D_3$) of 85 m, the nearest saturated cell distance ($D_{NC}$) may be determined to be 30 m, the minimum of the cell distances for the nearby saturated cells.

In some embodiments, the minimum operating BHP for the well 106 is determined based on the nearest saturated cell distance ($D_{NC}$), the threshold distance ($D_T$), the threshold water saturation value ($Sw_T$), and current operating conditions (e.g., including a current operating BHP and a current SWP) for the well 106. In some embodiments, the current operating conditions for the well 106 are determined by way of numerical simulation modeling of the well 106, using the model 128. For example, a current operating BHP for the well 106 (e.g., a pressure in the wellbore 120 at the depth of the perforations 146) of 800 pound per square inch (psi) and a current SWP for the well 106 (e.g., a static pressure determined for the cell 202e containing the perforations 146) of 1,200 psi at the first time ($T_1$) of Jan. 31, 2018 may be determined by way of numerical simulation modeling of the well 106, using the model 128. As described, at a given time, the BHP for the well 106 may define a pressure in the wellbore 120 at the depth of the perforations 146 at the given time, and the current SWP for the well 106 may define a pressure associated with the cell 202e containing the perforations 146 at the given time.

In some embodiments, the minimum operating BHP ($BHP_{min}^{n+1}$) for the well 106 is determined according to the following relationship:

$$BHP_{min}^{n+1} = BHP^n + (SWP^n - BHP^n) * Sw_T * \left(1 - \frac{D_{NC}}{D_T}\right), \quad (1)$$

where BHP" is the current operating BHP for the production well, SWP" is the current SWP for the production well, $SW_T$ is the threshold water saturation value, $D_T$ is the threshold distance, and $D_{NC}$ is the nearest cell distance. In some embodiments, a similar relationship is employed in the context of a breakthrough of various substance, such water or gas. In such an embodiment, a corresponding threshold saturation value $(S_T)$ (such as a threshold gas saturation value $(Sg_T)$) may be used in place of the threshold water saturation value $(Sw_T)$. For example, a threshold gas saturation value $(Sg_T)$ may be used in place of the threshold water saturation value $(Sw_T)$ in equation 1, and gas saturation values $(Sg)$ of the individual cells may be compared to the threshold gas saturation value $(Sg_T)$ to identify saturated cells. In some embodiments, the nearest cell distance $(D_{NC})$ from one iteration of determining the minimum operating BHP $(BHP_{min}^{n+1})$ for the well 106, is used as the threshold distance $(D_T)$ in the next iteration of determining the minimum operating BHP for the well 106. Such an iterative reduction in the search area may improve processing efficiency by reducing the area to be searched for nearby saturated cells, as it is determined that water is approaching the well 106. In some embodiments, if there are no nearby saturated cells identified for the well 106, then the minimum operating BHP is determined to be an absolute minimum operating BHP for the well 106. The absolute minimum operating BHP for the well 106 may be, for example, 50 psi above a dew point pressure or bubble point pressure for the well 106. This may enable the well 106 to operate at a relatively high production rate, which can compensate for relatively low production rates of other wells have nearby saturated cells.

In some embodiments, the well 106 is operated to maintain an operating BHP for the production well at or above the minimum operating BHP determined. For example, the well 106 may be operated at a production rate to maintain the operating BHP of the well 106 at or above the minimum operating BHP. Further, other production wells in a field of wells including the well 106 may be operated at a production rate and BHP to maintain the operating BHP of the well 106 at or above the minimum operating BHP, or injection wells in a field of wells including the well 106 may be operated at an injection rate and pressure to maintain the operating BHP of the well 106 at or above the minimum operating BHP. Thus, for example, if the well 106 is operating a production rate of 1000 barrels per day with a BHP of 5,000 psi, and a minimum operating BHP of 6,000 psi is determined, the production rate of the well 106 may be decreased to 800 barrels per day to adjust and maintain the BHP of the well 106 at 6,000 psi or greater. If at a later time (e.g., 1 year later) a second minimum operating BHP of 6,500 psi is determined, the production rate of the well 106 may be decreased to 700 barrels per day to adjust and maintain the BHP of the well 106 at 6,500 psi or greater. Adjustment of the production rate of the well 106 may include adjusting the well production system 124 of the well 106. For example, to decrease a production rate of the well 106, the surface valve 170 or the down-hole valve 162 may be further closed to further restrict the flow of production fluid into the wellbore 120. As a further example, to increase a production rate of the well 106, the surface valve 170 or the down-hole valve 162 may be further opened to further facilitate the flow of production fluid into the wellbore 120.

In some embodiments, a production schedule 129 for the well 106 is determined based on one or more minimum operating BHPs determined for the well 106. A production schedule 129 may specify one or more operating parameters for the well 106 corresponding to the minimum operating BHPs determined for the well 106. For example, generating a production schedule 129 for the well 106 may include the well control system 122 generating a production schedule 129 specifying a first minimum operating BHP of 1,000 psi for the well 106 for a first time period (e.g., Jan. 31, 2018 to Feb. 27, 2018), a second minimum operating BHP of 1,100 psi for the well 106 for a second time period (e.g., Feb. 28, 2018 to Mar. 30, 2018), a third minimum operating BHP of 1,150 psi for the well 106 for a third time period (e.g., Mar. 31, 2018 to Apr. 30, 2018), and so forth.

Figure 3:
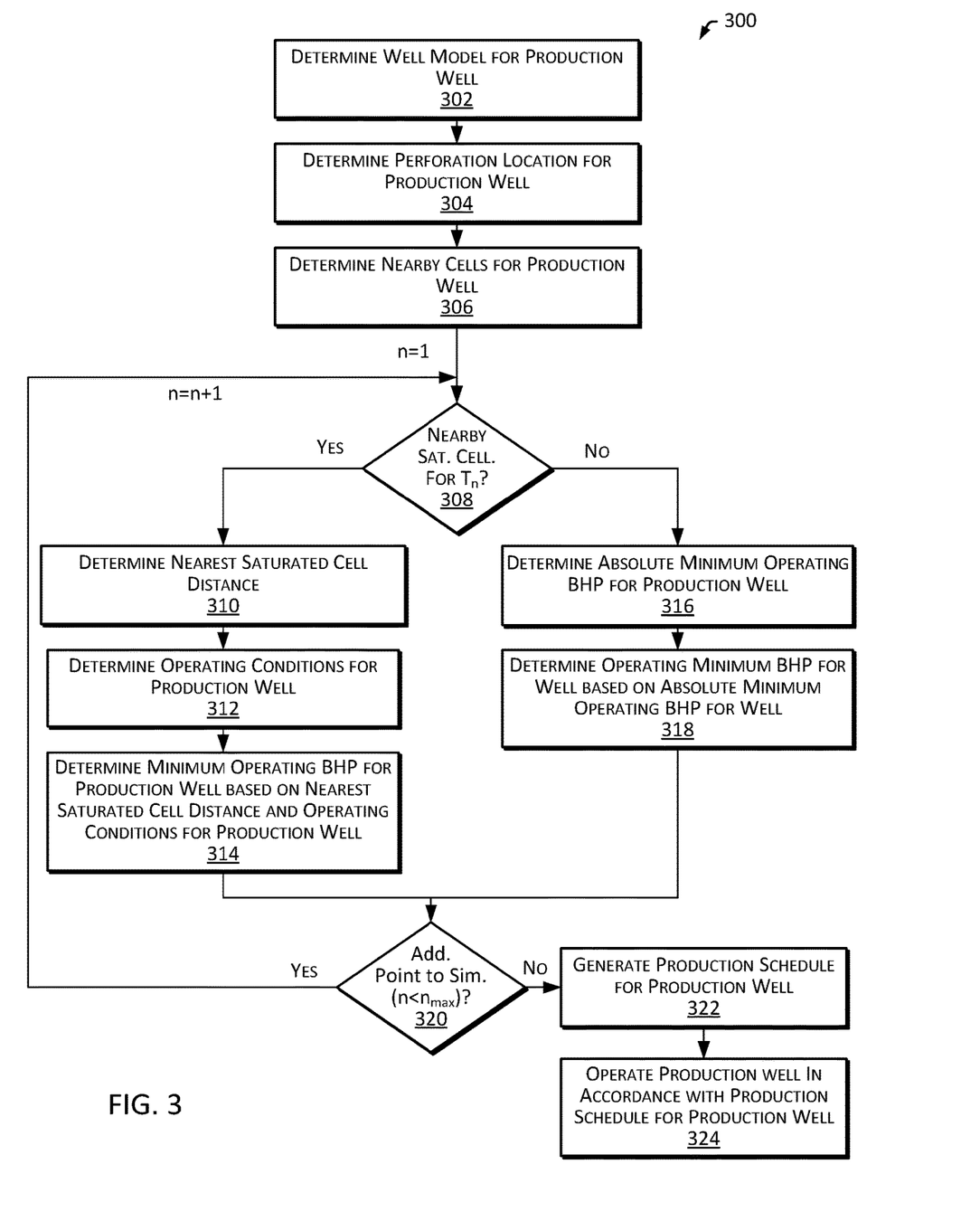
FIG. 3 is a flowchart that illustrates a method of operating a hydrocarbon production well based on water saturation of nearby cellular regions in accordance with one or more embodiments.

FIG. 3 is a flowchart that illustrates a method 300 of operating a hydrocarbon production well based on water saturation of nearby cellular regions, in accordance with one or more embodiments. In the context of the well 106, the operations of the method 300 may be performed, for example, by the well control system 122 or another operator of the well 106. For example, a simulation module of the well control system 122 may perform one or more of the data processing operations described to determine a minimum operating BHP for the well 106 for a given time period. A well operator, such as a control module of the well control system 122 or well personnel, may operate the well 106, for example, at a given production rate, to maintain a BHP of the well 106 at or above the minimum operating BHP for the given time period.

In some embodiments, the method 300 includes determining a well model of the production well (block 302). This can include, for example, the well control system 122 generating the model 128 of the well 106 way of history matching the historical well data 126, or using any suitable modeling technique.

In some embodiments, the method 300 includes determining a perforation location for the production well (block 304). This can include, for example, the well control system 122 identifying a location (e.g., three dimensional coordinates) of perforations 146 in the wellbore 120 of the well 106. The perforation location for the well 106 may be, for example, a known location of the perforations 146, recorded (e.g., in the historical well data 126) at the time the perforations were created in the wellbore 120. The perforation location for the well 106 may be a location in the wellbore 120 of the well 106, through which production fluids 164 are expected to flow from the formation 104 and reservoir 102 surrounding the wellbore 120, into the wellbore 120.

In some embodiments, the method 300 includes determining nearby cells for the production well (block 306). Determining nearby cells for the well 106 may include determining cells 202 within a threshold distance $(D_T)$ of the perforation location for the well 106. This may include, the control system 122 determining, for each cell 202 of the plurality of cells 202 surrounding the wellbore 120 of the well 106, whether the cell 202 is within the threshold distance $(D_T)$ of the perforations 146 of the wellbore 120. This may include, for each cell 202 of the plurality of cells 202 surrounding the wellbore 120 of the well 106, determining a cell location and cell distance for the cell 202, and determining that the cell 202 is within the threshold distance $(D_T)$ of the perforations 146 of the wellbore 120, if its cell distance is less than or equal to the threshold distance threshold distance $(D_T)$. The cells 202 determined to be within the threshold distance $(D_T)$ of the perforations 146 of the wellbore 120 may be referred to as "nearby cells". For example, determining cells within a threshold distance $(D_T)$ of the perforation location may include the control system 122 determining that the cells 202 of the set of nearby cells 206 are within the threshold distance ($D_T$) of the location of the perforations 146.

In some embodiments, the method 300 includes simulating the production well to determine a minimum operating BHP for each of one or more points in time, and operating the well in accordance with the minimum operating BHP(s) determined.

In some embodiments, the method 300 includes, for a given point in time ($T_n$), determining whether at least one nearby saturated cell exists (bock 308). This may include, the control system 122 conducting a numerical simulation modeling of the well 106 using the model 128 of the well 106 to determine, for each cell 202 of the nearby cells 206, a simulated water saturation value (Sw) for the cell 202 at the given point in time ($T_n$), and determining which if any cell 202 of the nearby cells 206 has a water saturation value (Sw) that is above a water saturation threshold value ($Sw_T$) at the given point in time ($T_n$).

Cells 202 of the set of nearby cells 206 determined to have a water saturation value (Sw) that is above a water saturation threshold value ($Sw_T$) at the given point in time ($T_n$) may be referred to as "nearby saturated cells" for the given point in time ($T_n$). For example, determining whether at least one nearby saturated cell exists at a first time ($T_1$) of Jan. 31, 2018, may include the control system 122 conducting a numerical simulation modeling of the well 106, using the model 128 of the well 106, to identify, for each cell 202 of the nearby cells 206, a simulated water saturation value (Sw) for the cell 202 at a first time ($T_1$) of Jan. 31, 2018, and determining that each of the cells 202a, 202b and 202c of the set of nearby cells 206 has a water saturation value (Sw) above the water saturation threshold value ($Sw_T$) at a first time ($T_1$) of Jan. 31, 2018 (and has a location within a threshold distance ($D_T$) of the perforations 146 of the wellbore 120) and is, thus, a nearby saturated cell. In subsequent iterations, a similar process can be conducted for subsequent points in time. For example, if the method is conducted for a simulation having a one month interval, in a second iteration, water saturation threshold values ($Sw_T$) and nearby saturated cells can be determined for a second time ($T_2$) of Feb. 28, 2018, in a third iteration, water saturation threshold values ($Sw_T$) and nearby saturated cells can be determined for a third time ($T_3$) of Mar. 31, 2018, and so forth.

In response to determining that at least one nearby saturated cell exists (bock 308), the method 300 may proceed to determining a nearest saturated cell distance (block 310), determining operating conditions for the production well (block 312), and determining a minimum operating BHP for the production well based on the nearest saturated cell distance and the operating conditions for the production well (block 314).

Determining a nearest saturated cell distance (or "nearest cell distance") (block 310) may include determining a smallest cell distance of the cell distances for the nearby saturated cells. For example, determining a nearest saturated cell distance for the well 106 may include the control system 122 determining that the cell 202a has a cell distance of 30 m, the cell 202b has a cell distance of 80 m, and the cell 202c has a cell distance of 85 m, and determining the nearest saturated cell distance ($D_{NC}$) to be 30 m (the minimum of the cell distances for the nearby saturated cells).

Determining operating conditions for the production well (block 312) may include determining an operating BHP and SWP for the production well. In some embodiments, the current operating conditions for the production well are determined by way of numerical simulation modeling of the well, using the model for the well. For example, determining operating conditions for the well 106 may include the control system 122 conducting a numerical simulation modeling of the well 106 using the model 128, to determine a current operating BHP for the well 106 of 800 psi and a current SWP for the well 106 of 1,200 psi at the first time ($T_1$) of Jan. 31, 2018. In subsequent iterations, a similar process can be conducted for subsequent points in time. For example, if the method is conducted at a simulation having a one month interval, in a second iteration, a current operating BHP and a current SWP for the well 106 can be determined for the second time ($T_2$) of Feb. 28, 2018, in a third iteration, a current operating BHP and a current SWP for the well 106 can be determined for the third time ($T_3$) of May 31, 2018, and so forth.

Determining a minimum operating BHP for the production well based on the nearest saturated cell distance and the operating conditions for the production well (bock 314) may include determining the minimum operating BHP ($BHP_{min}^{n+1}$) for the production well based on the relationship of equation 1. For example, the control system 122 may determine a first minimum operating BHP of 1,000 psi for the well 106 for the first time ($T_1$) of Jan. 31, 2018, based on the relationship of equation 1. In subsequent iterations, a similar process can be conducted for subsequent points in time. For example, a second minimum operating BHP of 1,100 psi for the well 106 may be determined for the second time ($T_2$) of Feb. 28, 2018, a third minimum operating BHP of 1,150 psi for the well 106 may be determined for the third time ($T_3$) of May 31, 2018, and so forth.

In some embodiments, the nearest cell distance ($D_{NC}$) from one iteration of determining the minimum operating BHP ($BHP_{min}^{n+1}$) for the well 106, is used at the threshold distance ($D_T$) in the next iteration of determining the minimum operating BHP ($BHP_{min}^{n+1}$) for the well 106. Continuing with the above example, the threshold distance ($D_T$) may initially be set to 100 m, and in response to determining the nearest saturated cell distance ($D_{NC}$) to be 30 m in an iteration corresponding to the first time ($T_1$) of Jan. 31, 2018, the threshold distance ($D_T$) may be set to 30 m in the next iteration corresponding to the second time ($T_2$) of Feb. 28, 2018. Such an iterative reduction in the search area may improve processing efficiency by reducing the area to be searched for nearby saturated cells, as water is approaching the well 106.

In response to determining that no nearby saturated cell exists (bock 308), the method 300 may proceed to determining an absolute minimum operating BHP for the production well (block 316) and determining the minimum operating BHP for the production well to be the absolute minimum operating BHP for the production well (block 318). Determining an absolute minimum operating BHP for the production well may include determining the absolute minimum operating BHP for the production well to be above the dew point pressure or bubble point pressure for the production well. For example, determining an absolute minimum operating BHP for the well 106 may include the control system 122 determining an absolute minimum operating BHP for the well 106 that is 50 psi above a dew point pressure (or bubble point pressure) (e.g., 200 psi) for the well 106, and determining the minimum operating BHP for the well 106 for the given time ($T_n$) to be the absolute minimum operating BHP for the well 106 may include the control system 122 determining the minimum operating BHP for the well 106 for the given time ($T_n$) to be 50 psi above the dew point pressure for the well 106 (e.g., determining the minimum operating BHP for the well 106 for the given time ($T_n$) to be 250 psi).

During a simulation, after determining the minimum operating BHP for the well 106 for the given time ($T_n$), the method may proceed to determining whether there are additional points in time to be simulated (block 320). If it is determined that there are additional points in time to be simulated (e.g., $n<n_{max}$), the method 300 may proceed to a subsequent iteration to determine the minimum operating BHP for the well 106 for the next given time ($T_{n+1}$). For example, if the simulation is run for a monthly interval over a 24 month period, "n" may be set to 1 in an initial iteration, and $n_{max}$ may be 24 (with $T_1$=Jan. 31, 2018, $T_2$=Feb. 28, 2018 . . . and $T_{24}$=Dec. 31, 2019), such that the simulation generates minimum operating BHP for the well 106 for each month over the 24 month period. In response to determining that there are no additional points in time to be simulated (e.g., $n=n_{max}$) (block 320), the method 300 may proceed to generating a production schedule for the production well (block 322). Generating a production schedule for the production well may include generating a production schedule corresponding to one or more minimum operating BHPs determined for the production well. Continuing with the above example, generating a production schedule 129 for the well 106 may include the well control system 122 generating a production schedule 129 specifying a first minimum operating BHP of 1,000 psi for the well 106 for a first time period of Jan. 31, 2018 to Feb. 27, 2018, a second minimum operating BHP of 1,100 psi for the well 106 for a second time period of Feb. 28, 2018 to Mar. 30, 2018, a third minimum operating BHP of 1,150 psi for the well 106 for a third time period of Mar. 31, 2018 to Apr. 30, 2018, and so forth.

Method 300 may include operating the production well in accordance with the production schedule for the production well (block 324). Operating the production well in accordance with the production schedule for the production well may include operating the production well at a production rate to maintain the BHP of the production well at or above the prescribed minimum operating BHP for the production well during certain periods of time. For example, if a minimum operating BHP of 6,000 psi is determined for the well 106, operating the well 106 in accordance with the production schedule 129 for the well 106, may include a well operator, such as a control module of the well control system 122 or well personnel, controlling the well production system 124 of the well 106 to operate at a production rate that maintains the BHP of the well 106 at or above the first minimum operating BHP of 1,000 psi during the first time period (e.g., from Jan. 31, 2018 to Feb. 27, 2018), at or above the second minimum operating BHP of 1,100 psi for the second time period (e.g., from Feb. 28, 2018 to Mar. 30, 2018), at or above the third minimum operating BHP of 1,150 psi during the third time period (e.g., from Mar. 31, 2018 to Apr. 30, 2018), and so forth. Operating a well in such a manner may help to inhibit breakthrough, and optimize hydrocarbon production from the well.

Figure 4:
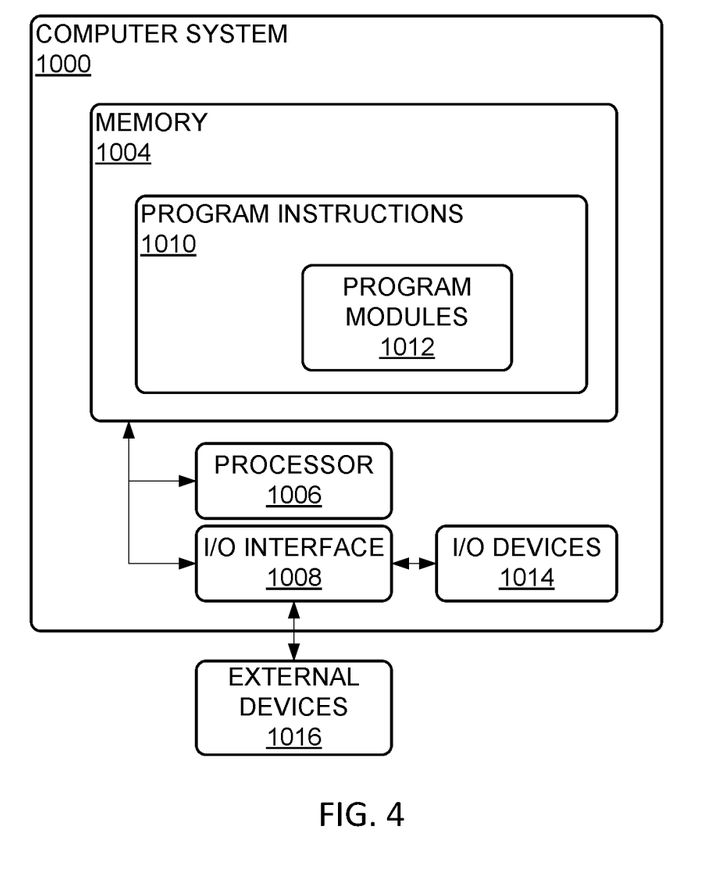
FIG. 4 is a diagram that illustrates an example computer system in accordance with one or more embodiments.

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the well control system 122 or the method 300.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, such as sensors, valves, pumps, motors, other computers and networks. In some embodiments, the I/O interface 1008 includes one or both of an antenna and a transceiver. In some embodiments, the external devices 1016 include a BHPS, a SPS, a flow meter a logging tool (e.g., a resistivity logging tool), the completion unit 160 (e.g., including the down-hole valve 162), or the surface valve 170.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for operating a hydrocarbon production well comprising:
   determining whether any cellular volumes of a plurality of cellular volumes surrounding a wellbore of a hydrocarbon production well has a saturation value for a given time that is above a threshold saturation value and has a location that is within a threshold distance of a perforation location, the perforation location defined by a location of perforations in the wellbore of the hydrocarbon production well; and
   in response to determining that at least one of the cellular volumes of the plurality of cellular volumes has a saturation value for the given time that is above the threshold saturation value and has a location that is within the threshold distance of the perforation location:
      determining a nearest cell distance defined by a minimum distance between the perforation location and locations of the at least one of the cellular volumes having a saturation value that is above the threshold saturation value and having a location that is within the threshold distance of the perforation location;
      determining operating conditions for the production well for the given time, the operating conditions comprising:
         an operating bottom-hole pressure (BHP) for the production well for the given time; and
         a surface well pressure (SWP) for the production well for the given time;
      determining a minimum operating BHP ($BHP_{n+1 min}$) for the given time according to the following relationship:

$$BHP_{n+1min} = BHP^n + (SWP^n - BHP^n) * S_T * (1 - D_{NC}/D_T),$$

wherein $BHP^n$ is the operating BHP for the production well for the given time,
         $SWP^n$ is the SWP for the production well for the given time,
         $S_T$ is the threshold saturation value,
         $D_T$ is the threshold distance, and
         $D_{NC}$ is the nearest cell distance; and
      operating the hydrocarbon production well at a production rate to maintain a BHP of the production well at or above the minimum operating BHP for a time period associated with the given time.

2. The method of claim 1, wherein the perforations comprise perforations in a casing of the wellbore, and wherein the perforation location comprises a location of the perforations in the casing of the wellbore.

3. The method of claim 1, further comprising:
   determining, using a well model for the production well, a saturation value for each cellular volume of the plurality of cellular volumes for the given time;
   determining, using the well model for the production well, the operating BHP for the production well for the given time; and
   determining, using the well model for the production well, the SWP for the production well for the given time.

4. The method of claim 1, wherein the saturation value is a water saturation value, and the threshold saturation value is a threshold water saturation value.

5. The method of claim 1, wherein determining a nearest cell distance comprises:
   for each cellular volume of the at least one of the cellular volumes having a saturation value that is above the threshold saturation value and having a location that is within the threshold distance of the perforation location:
      determining a cell location; and
      determining a cell distance defined by a distance between the cell location and the perforation location,
   wherein the nearest cell distance is the minimum of the cell distances determined for the at least one of the cellular volumes having a saturation value for the given time that is above the threshold saturation value and having a location that is within the threshold distance of the perforation location.

6. The method of claim 5, wherein the cell location for each cellular volume comprises a location at a center of the cellular volume.

7. The method of claim 1, wherein operating the hydrocarbon production well at a production rate to maintain the BHP of the production well at or above the minimum operating BHP comprises adjusting a flow control valve to achieve the production rate to maintain the BHP of the production well at or above the minimum operating BHP.

8. The method of claim 1, further comprising:
   determining whether any of the cellular volumes of the plurality of cellular volumes has a second saturation value for a second time that is above the threshold saturation value and has a location that is within the threshold distance of the perforation location; and in response to determining that none of the cellular volumes of the plurality of cellular volumes has a second saturation value for the second time that is above the threshold saturation value and has a location that is within the threshold distance of the perforation location:

determining a second minimum operating BHP for the second time defined by an absolute minimum operating BHP for the hydrocarbon production well; and operating the hydrocarbon production well to maintain the BHP of the production well at or above the second minimum operating BHP for a second time period associated with the second time.

9. The method of claim 8, wherein the absolute minimum operating BHP for the hydrocarbon production well is above a dew point pressure or a bubble point pressure for the hydrocarbon production well.

10. The method of claim 1, further comprising generating a production schedule defining, for each of a plurality of different time periods, a minimum operating BHP, wherein the production schedule defines the minimum operating BHP for the time period associated with the given time, and wherein the hydrocarbon production well is operated in accordance with the production schedule to, for each individual time period of the plurality of different time periods, maintain the BHP for the production well at or above the minimum operating BHP defined by the production schedule for the individual time period.

11. A hydrocarbon production well system, comprising:
a well production system configured to regulate a production rate of a hydrocarbon production well; and
a well control system configured to perform the following operations:
determine whether any cellular volumes of a plurality of cellular volumes surrounding a wellbore of the hydrocarbon production well has a saturation value for a given time that is above a threshold saturation value and has a location that is within a threshold distance of a perforation location, the perforation location defined by a location of perforations in the wellbore of the hydrocarbon production well; and in response to determining that at least one of the cellular volumes of the plurality of cellular volumes has a saturation value for the given time that is above the threshold saturation value and has a location that is within the threshold distance of the perforation location:
determine a nearest cell distance defined by a minimum distance between the perforation location and locations of the at least one of the cellular volumes having a saturation value that is above the threshold saturation value and having a location that is within the threshold distance of the perforation location;
determine operating conditions for the production well for the given time, the operating conditions comprising:
an operating bottom-hole pressure (BHP) for the production well for the given time; and
a surface well pressure (SWP) for the production well for the given time;
determine a minimum operating BHP (BHP$_{min}^{n+1}$) for the given time according to the following relationship:

$$BHP_{min}^{n+1} = BHP^n + (SWP^n - BHP^n) * S_T * \left(1 - \frac{D_{NC}}{D_T}\right),$$

wherein BHP$^n$ is the operating BHP for the production well for the given time,
SWP$^n$ is the SWP for the production well for the given time,
$S_T$ is the threshold saturation value,
$D_T$ is the threshold distance, and
$D_{NC}$ is the nearest cell distance; and
control operation of the well production system to operate the hydrocarbon production well at a production rate to maintain a BHP of the production well at or above the minimum operating BHP for a time period associated with the given time.

12. The system of claim 11, wherein the perforations comprise perforations in a casing of the wellbore, and wherein the perforation location comprises a location of the perforations in the casing of the wellbore.

13. The system of claim 11, wherein the well control system is further configured to perform the following operations:
determine, using a well model for the production well, a saturation value for each cellular volume of the plurality of cellular volumes for the given time;
determine, using the well model for the production well, the operating BHP for the production well for the given time; and
determine, using the well model for the production well, the SWP for the production well for the given time.

14. The system of claim 11, wherein the saturation value is a water saturation value, and the threshold saturation value is a threshold water saturation value.

15. The system of claim 11, wherein determining a nearest cell distance comprises:
for each cellular volume of the at least one of the cellular volumes having a saturation value that is above the threshold saturation value and having a location that is within the threshold distance of the perforation location:
determining a cell location; and
determining a cell distance defined by a distance between the cell location and the perforation location,
wherein the nearest cell distance is the minimum of the cell distances determined for the at least one of the cellular volumes having a saturation value for the given time that is above the threshold saturation value and having a location that is within a threshold distance of the perforation location.

16. The system of claim 15, wherein the cell location for each cellular volume comprises a location at a center of the cellular volume.

17. The system of claim 11, wherein controlling operation of the well production system to operate the hydrocarbon production well at a production rate to maintain the BHP of the production well at or above the minimum operating BHP comprises adjusting a flow control valve of the well production system to achieve the production rate to maintain the BHP of the production well at or above the minimum operating BHP.

18. The system of claim 11, wherein the well control system is further configured to perform the following operations:

in response to determining that none of the cellular volumes of the plurality of cellular volumes has a saturation value for the given time that is above the threshold saturation value and has a location that is within the threshold distance of the perforation location:
    determine a minimum operating BHP for the given time defined by an absolute minimum operating BHP for the hydrocarbon production well; and
    control operation of the well production system to operate the hydrocarbon production well at a production rate to maintain the BHP of the production well at or above the minimum operating BHP for a time period associated with the given time.

19. The system of claim 18, wherein the absolute minimum operating BHP for the hydrocarbon production well is above a dew point pressure or a bubble point pressure for the hydrocarbon production well.

20. The system of claim 11, wherein the well control system is further configured to perform the following operations:
generate a production schedule defining, for each of a plurality of different time periods, a minimum operating BHP, wherein the production schedule defines the minimum operating BHP for the time period associated with the given time, and wherein the hydrocarbon production well is operated in accordance with the production schedule to, for each individual time period of the plurality of different time periods, maintain the BHP of the production well at or above the minimum operating BHP defined by the production schedule for the individual time period.

21. A non-transitory computer readable storage medium comprising program instructions stored thereon that are executable by a processor to perform the following operations:
determining whether any cellular volumes of a plurality of cellular volumes surrounding a wellbore of a hydrocarbon production well has a saturation value for a given time that is above a threshold saturation value and has a location that is within a threshold distance of a perforation location, the perforation location defined by a location of perforations in the wellbore of the hydrocarbon production well; and
in response to determining that at least one of the cellular volumes of the plurality of cellular volumes has a saturation value for the given time that is above the threshold saturation value and has a location that is within the threshold distance of the perforation location:
    determining a nearest cell distance defined by a minimum distance between the perforation location and locations of the at least one of the cellular volumes having a saturation value that is above the threshold saturation value and having a location that is within the threshold distance of the perforation location;
    determining operating conditions for the production well for the given time, the operating conditions comprising:
        an operating bottom-hole pressure (BHP) for the production well for the given time; and
        a surface well pressure (SWP) for the production well for the given time;
    determining a minimum operating BHP ($BHP_{min}^{n+1}$) for the given time according to the following relationship:

$$BHP_{min}^{n+1} = BHP^n + (SWP^n - BHP^n) * S_T * \left(1 - \frac{D_{NC}}{D_T}\right),$$

wherein $BHP^n$ is the operating BHP for the production well for the given time,
    $SWP^n$ is the SWP for the production well for the given time,
    $S_T$ is the threshold saturation value,
    $D_T$ is the threshold distance, and
    $D_{NC}$ is the nearest cell distance; and
    operating the hydrocarbon production well at a production rate to maintain a BHP of the production well at or above the minimum operating BHP for a time period associated with the given time.

22. The medium of claim 21, the operations further comprising:
in response to determining that none of the cellular volumes of the plurality of cellular volumes has a saturation value for the given time that is above the threshold saturation value and has a location that is within the threshold distance of the perforation location:
    determining a minimum operating BHP for the given time defined by an absolute minimum operating BHP for the hydrocarbon production well; and
    operating the hydrocarbon production well at a production rate to maintain the BHP of the production well at or above the minimum operating BHP for a time period associated with the given time.

\* \* \* \* \*